United States Patent
Hari et al.

(10) Patent No.: US 11,115,324 B2
(45) Date of Patent: Sep. 7, 2021

(54) SYSTEM AND METHOD FOR PERFORMING SEGMENT ROUTING OVER AN MPLS NETWORK

(71) Applicant: NOKIA SOLUTIONS AND NETWORKS OY, Espoo (FI)

(72) Inventors: Adiseshu Hari, Holmdel, NJ (US); T. V. Lakshman, Holmdel, NJ (US)

(73) Assignee: NOKIA SOLUTIONS NETWORKS OY, Espoo (FI)

( * ) Notice: Subject to any disclaimer, the term of this patent is extended or adjusted under 35 U.S.C. 154(b) by 98 days.

(21) Appl. No.: 16/552,437

(22) Filed: Aug. 27, 2019

(65) Prior Publication Data

US 2021/0067441 A1    Mar. 4, 2021

(51) Int. Cl.
| | |
|---|---|
| *H04L 12/723* | (2013.01) |
| *H04L 12/715* | (2013.01) |
| *H04L 12/947* | (2013.01) |
| *H04L 12/721* | (2013.01) |
| *H04L 12/741* | (2013.01) |

(52) U.S. Cl.
CPC ............ *H04L 45/507* (2013.01); *H04L 45/34* (2013.01); *H04L 45/38* (2013.01); *H04L 45/54* (2013.01); *H04L 45/64* (2013.01); *H04L 49/25* (2013.01)

(58) Field of Classification Search
CPC ....... H04L 69/22; H04L 43/026; H04L 45/54; H04L 45/38
See application file for complete search history.

(56) References Cited

U.S. PATENT DOCUMENTS

| | | |
|---|---|---|
| 4,887,202 A | 12/1989 | Tanaka et al. |
| 5,371,857 A | 12/1994 | Takagi |
| 6,961,941 B1 | 11/2005 | Nelson et al. |
| 7,194,538 B1 | 3/2007 | Rabe et al. |
| 7,275,103 B1 | 9/2007 | Thrasher et al. |

(Continued)

OTHER PUBLICATIONS

Kesavan, et al., "Differential Virtual Time (DVT): Rethinking I/O Service Differentiation for Virtual Machines", Differential virtual time (DVT): rethinking I/O service differentiation for virtual machines. Proceedings of the 1st ACM symposium on Cloud computing. ACM, 12 pages. (2010).

(Continued)

*Primary Examiner* — Raj Jain
(74) *Attorney, Agent, or Firm* — Kramer Amado PC (57) ABSTRACT

A method for controlling packet routing in a network includes identifying segment identifications (IDs) for a number of switches and arranging a first number of the segment IDs into a multi-protocol label switching (MPLS) label field. The method further includes identifying an output port of a respective one of the number of switches located along a network path between source and destination nodes. The switches may route the packet based on corresponding ones of the segment IDs in the MPLS label field. In performing this routing operation, each switch may modify the MPLS label field with remaining ones of the segment IDs that have been shifted in position and padded with zeros, after the segment ID corresponding to the switch has been popped from the MPLS label field. The method therefore presents a technique for performing segment routing through network equipment designed to support MPLS routing.

17 Claims, 11 Drawing Sheets

(56) References Cited

U.S. PATENT DOCUMENTS

| | | |
|---|---|---|
| 7,328,287 B1 | 2/2008 | Arumugham et al. |
| 7,370,324 B2 | 5/2008 | Goud et al. |
| 7,389,393 B1 | 6/2008 | Karr |
| 7,757,231 B2 | 7/2010 | Anderson et al. |
| 7,783,779 B1 | 8/2010 | Scales et al. |
| 7,885,276 B1 | 2/2011 | Lin |
| 7,886,031 B1 | 2/2011 | Taylor et al. |
| 7,934,020 B1 | 4/2011 | Xu et al. |
| 8,127,291 B2 | 2/2012 | Pike et al. |
| 8,194,674 B1 | 6/2012 | Pagel et al. |
| 8,204,980 B1 | 6/2012 | Sandstrom et al. |
| 8,291,414 B2 | 10/2012 | Bansal |
| 8,370,833 B2 | 2/2013 | Bolles et al. |
| 8,407,448 B1 | 3/2013 | Hayden et al. |
| 8,429,675 B1 | 4/2013 | Radhakrishnan et al. |
| 8,463,825 B1 | 6/2013 | Harty et al. |
| 8,601,473 B1 | 12/2013 | Aron et al. |
| 8,650,273 B2 | 2/2014 | Lambert et al. |
| 8,850,156 B2 | 9/2014 | Yang et al. |
| 8,850,429 B2 | 9/2014 | Goswami |
| 8,863,124 B1 | 10/2014 | Aron |
| 8,910,156 B1 | 12/2014 | Hosekote-Kenchammana |
| 8,930,945 B2 | 1/2015 | Boogert |
| 8,966,476 B2 | 2/2015 | Doan |
| 8,997,097 B1 | 3/2015 | Aron et al. |
| 9,047,313 B2 | 6/2015 | Baron |
| 9,052,936 B1 | 6/2015 | Aron et al. |
| 9,369,371 B2 * | 6/2016 | Filsfils ................ H04L 43/50 |
| 10,291,532 B1 * | 5/2019 | Tiruveedhula ........ H04L 47/125 |
| 2003/0167341 A1 * | 9/2003 | Hayashi ................ H04L 45/00 |
| | | 709/238 |
| 2006/0271677 A1 | 11/2006 | Mercier |
| 2011/0239216 A1 | 9/2011 | Miyajima |
| 2012/0014386 A1 | 1/2012 | Xiong et al. |
| 2015/0078378 A1 * | 3/2015 | Wijnands ............. H04L 45/74 |
| | | 370/390 |
| 2015/0103839 A1 * | 4/2015 | Chandrashekhar ..... G06F 9/455 |
| | | 370/401 |
| 2018/0309647 A1 * | 10/2018 | Rosenberg ............ H04L 43/18 |
| 2019/0222483 A1 * | 7/2019 | Bashandy ............. H04L 41/12 |
| 2019/0356570 A1 * | 11/2019 | Nainar ................. H04L 43/10 |
| 2020/0162375 A1 * | 5/2020 | Chen ................... H04L 45/745 |

OTHER PUBLICATIONS

Pettit, et al., "Virtual Switching in an Era of Advanced Edges", Procedings of the 2nd Workshop on Data Center-Converged and Virtual Ethernet Switching (DC-CAVES), Sep. 2010 Procedings of the 2nd Workshop on Data Center-Converged and Virtual Ethernet Switching (DC-CAVES), 7 pages (Sep. 2010).

Singh, et al., "Server-Storage Virtualization: Integration and Load Balancing in Data Centers", SC '08: Proceedings of the 2008 ACM/IEEE Conference on Supercomputing, 12 pages (Date of Conference: Nov. 15-21, 2008).

* cited by examiner

SYSTEM AND METHOD FOR PERFORMING SEGMENT ROUTING OVER AN MPLS NETWORK

TECHNICAL FIELD

This disclosure relates generally to networks, and more specifically, but not exclusively, to controlling the routing of packets in a communications network.

BACKGROUND

Multi-protocol Label Switching (MPLS) is a technique used to route data through a communications network. Unlike other techniques which use network addresses to control routing, MPLS routes data packets across nodes using labels. These labels identify virtual links (paths) between distant nodes, rather than endpoints, and are useable with different network protocols (e.g., T1, E1, ATM, Frame Relay, DSL, etc.), hence the term "multi-protocol" label switching.

Routing data using MPLS is advantageous in a number of respects. For example, MPLS is able to perform routing without the use of complex lookups in a routing table. Using labels (as opposed to comprehensive network addresses) also increases the rate of traffic flow. For these and other reasons, many networks today use equipment designed to implement MPLS routing. However, this equipment is restrictive in nature in that it prevents the networks from supporting other types of routing techniques. Segment routing is a new routing technique that is specifically designed for MPLS networks.

SUMMARY

A brief summary of various example embodiments is presented. Some simplifications and omissions may be made in the following summary, which is intended to highlight and introduce some aspects of the various example embodiments, but not to limit the scope of the invention. Detailed descriptions of example embodiments adequate to allow those of ordinary skill in the art to make and use the inventive concepts will follow in later sections.

In accordance with one or more embodiments, a method for controlling packet routing in a network includes identifying segment identifications (IDs) for a number of switches and arranging a first number of the segment IDs into a first field of a packet, wherein the first field is a first multi-protocol label switching (MPLS) label field that is M bits in length, each of the segment IDs being represented by N bits in length and identifying an output port of a respective one of the number of switches located along a network path between a source node and a destination node, wherein M is greater than a cumulative sum of respective Ns for the first number of segment IDs. The first number of segment IDs may be arranged in the first MPLS label field in an order corresponding to a sequence of the number of switches on the network path. The method may include padding the first MPLS label field with one or more predetermined values for bits unoccupied by the segment IDs. The one or more predetermined values may be zeros.

The first number of the segment IDs arranged into the first MPLS label field may correspond to all of the switches on the network path between the source node and the destination node. Each of the segment IDs may be compressed into N bits. In one embodiment, the value of N may be at least 3. The method may include arranging a second number of the segment IDs into a second field of the packet when the number of switches is greater than three, where the second field of the packet is a second MPLS label field. The method may include identifying the segment IDs based on information in a routing table.

In accordance with one or more embodiments, a method for controlling packet routing includes receiving a packet at a switch of a data network, accessing first routing information from the packet, modifying the packet to include second routing information, and transmitting the packet from the switch based on the first routing information, wherein the packet includes a first multi-protocol label switching (MPLS) label field from which the first routing information is accessed, the first routing information including a first segment identification (ID) and at least a second segment ID, and wherein modifying the packet includes replacing the first routing information with the second routing information in the first MPLS label field, the second routing information omitting the first segment ID and including at least the second segment ID, the packet transmitted from the switch based on the first segment ID.

The method may include replacing the first routing information with the second routing information includes replacing the first segment ID with one or more predetermined values in the first MPLS label field. The one or more predetermined values may be zeros. The method may include replacing the first routing information with the second routing information includes shifting a position of the at least second segment ID in the first MPLS label field. The method may include determining an output port number based on the first segment ID, wherein transmitting the packet based on the first routing information includes transmitting the packet through the output port number.

In accordance with one or more embodiments, a system for controlling packet routing in a network comprises a memory configured to store at least one algorithm and a processor configured to execute the at least one algorithm to identify segment identifications (IDs) for a number of switches, and arrange a first number of the segment IDs into a first field of a packet, wherein the first field is a first multi-protocol label switching (MPS) label field that is 20 bits in length, each of the segment IDs being N bits in length and identifying an output port of a respective one of the number of switches located along a network path between a source node and a destination node.

The processor may arrange the first number of segment IDs in the first MPLS label field in an order corresponding to a sequence of the number of switches on the network path. The processor may pad the first MPLS label field with one or more predetermined values for bits unoccupied by the segment IDs. The first number of the segment IDs arranged into the first MPLS label field may correspond to all of the switches on the network path between the source node and the destination node. The processor may arrange a second number of the segment IDs into a second field of the packet when the number of switches is greater than three, and wherein the second field of the packet is a second MPLS label field. The first MPLS field may have a length of 20 bits, each of the first number of segment IDs may be compressed into N bits.

BRIEF DESCRIPTION OF THE DRAWINGS

The accompanying figures together with the detailed description below, are incorporated in and form part of the specification, and serve to further illustrate example embodiments of concepts found in the claims and explain various principles and advantages of those embodiments. These and other more detailed and specific features are more fully disclosed in the following specification, reference being had to the accompanying drawings, in which:

DETAILED DESCRIPTION

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. Descriptors such as "first," "second," "third," etc., are not meant to limit the order of elements discussed, are used to distinguish one element from the next, and may be interchangeable.

Embodiments disclosed herein relate to a system and method for performing segment routing in a communications network that uses equipment designed to route data using multi-protocol label switching (MPLS). Segment routing is an evolution of MPLS that retains MPLS switching equipment. In the disclosed embodiments, segment routing may be performed using MPLS communication equipment by compressing the segments used to perform segment routing into the header of a data packet that conforms to the MPLS protocol. Because the segments are significantly smaller in size than the fixed-length of an MPLS label (for which a corresponding field of the packet header is designed to accept), multiple segments may be inserted into one MPLS header field in order to facilitate a plurality of corresponding hops among nodes situated between source and destination nodes in the network. When the packet includes multiple MPLS header fields, even more segments may be inserted into the packet to support segment routing using MPLS equipment. As a result, segment routing may be implemented within the framework of an MPLS protocol, thereby increasing the versatility of the network especially in cases where segment routing may be preferable to MPLS routing for certain applications.

Figure 1:
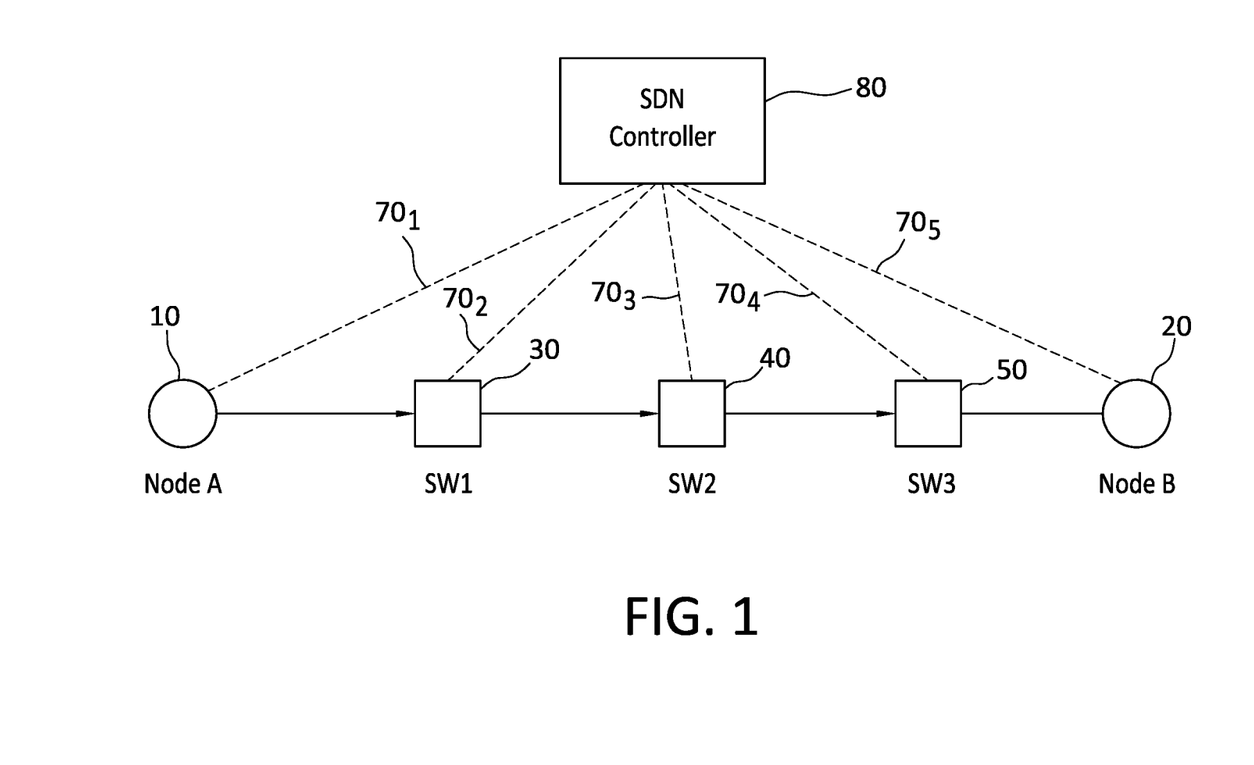
FIG. 1 illustrates an example of a network that routes packets through switches.

FIG. 1 illustrates an example of a network that includes a source node 10 and a destination node 20, also labeled Node A and Node B respectively. In a typical scenario, one or more intervening nodes are arranged between the source and destination nodes. In this example, three intervening switches 30, 40, and 50 are depicted, which may also be referred to as switches SW1, SW2, and SW3. A different number of intervening switches may be included in another embodiment. Operation of the network switches and nodes for purposes of routing packets may be controlled, at least in part, by a software-defined network (SDN) controller 80. The SDN controller may generate and manage lookup tables that are to be sent to and used by the nodes in performing routing operations based on the routing information in each packet header. Connections between the SDN controller 80 and the nodes are illustrated by corresponding signal lines $70_1$ to $70_5$ in this example. (In one embodiment, the intervening switches may be nodes).

The source node 10 includes a processor for generating segment identifications (IDs) that specify the intervening nodes 30, 40, and 50 and the destination node 20. In one embodiment, the segment IDs identify the routing addresses of corresponding ones of the intervening and designation nodes. As will become apparent below, each segment ID may be compressed into a fixed number of bits (e.g., 6 bits) that is substantially smaller than the fixed bit-length (e.g., 20 bits) of an MPLS label, in order to allow multiple segment IDs for performing segment routing to be inserted into the header field of a packet formatted for holding an MPLS label.

Figure 2A:
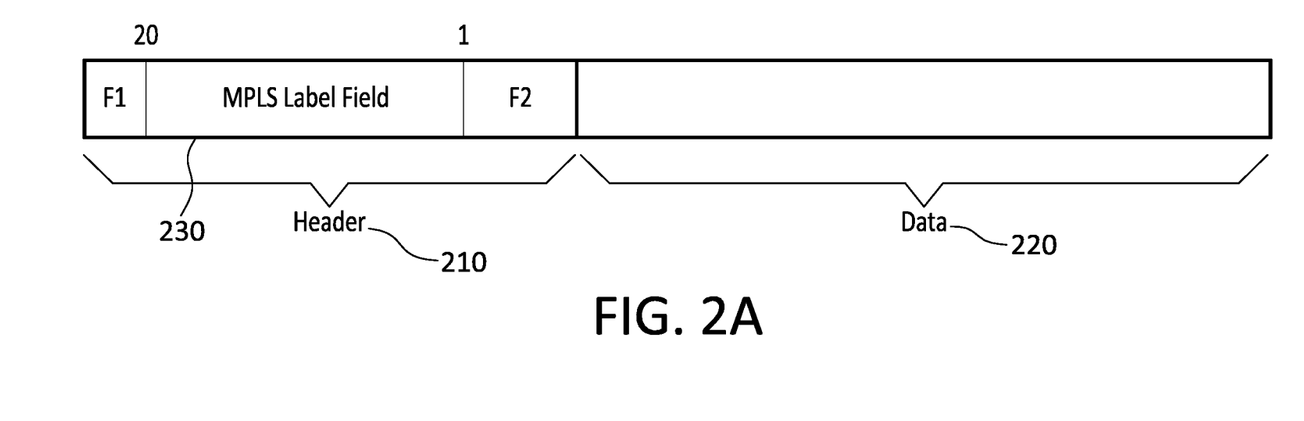
FIG. 2A illustrates an example of a packet formatted to route data using an MPLS label.

FIG. 2A illustrates an example of a packet formatted to route data using an MPLS label. Referring to FIG. 2A, the packet includes a header 210 and a payload 220. The header 210 includes a number of fields including an MPLS label field 230 and two additional fields F1 and F2 that may store, for example, various flags and/or other information. In one embodiment, the flag may store one or more bits indicating whether the packet is to be routed based on an MPLS technique or whether the packet is to be routed using a segment routing technique. The MPLS label field stores a 20-bit label which conforms to the MPLS protocol. The 20-bit label is a global label which indicates the information that is to be used to route the packet between the source node 10 and the destination node 20. In this example, the packet header only includes one MPLS label. In other cases, the packet header may include a plurality of MPLS headers when, for example, additional routing information is to be used in routing the packet. The payload 220 stores the data for the packet.

Figure 2B:
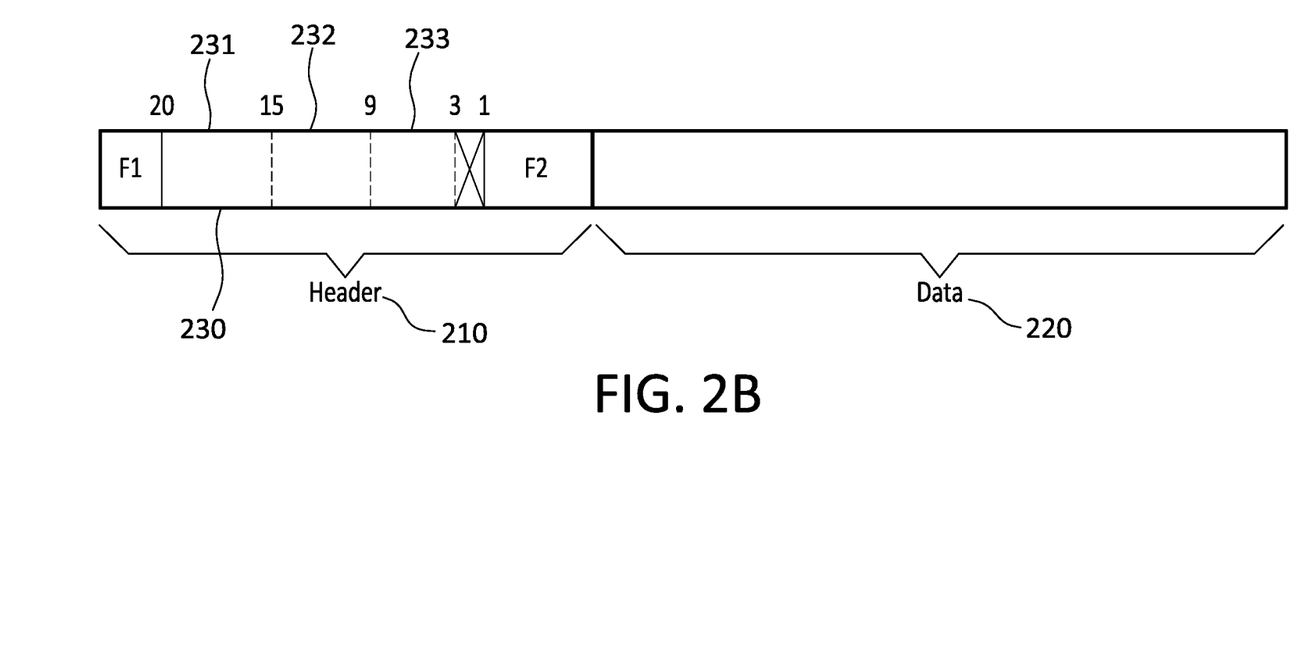
FIG. 2B illustrates the MPLS label field of the packet of FIG. 2A that includes segment IDs for performing segment routing in accordance with one embodiment.

FIG. 2B illustrates an example of how the MPLS label field of the packet header of FIG. 2A may be modified to include segments for performing segment routing in accordance with one or more embodiments. In this example, the source node 10 has generated the packet to include three segments (for performing segment routing) in the MPLS label field 230. The three segments may be identified, for example, based on routing table information (e.g., obtained from the SDN controller 80) that stores segment IDs for the segments (or hops) between the source and destination nodes.

Initially, the source node 10 determines routing information for (e.g., output port number leading to) the first intervening node (first switch) 30, for example, based on knowledge of the destination node. This routing information may be determined, for example, by information stored in a routing table of source node 10.

In the MPLS label field 230, the first segment ID 231 identifies routing information to be used in transmitting the packet along a path leading to the second intervening node (or switch) 40. The second segment ID 232 identifies routing information to be used in transmitting the packet from the second intervening node 40 along a path leading to the third intervening node (or switch) 50. The third segment ID 233 identifies routing information to be used in transmitting the packet from the third intervening node (or switch) 50 along a path leading to the destination node 20 (or when the packet includes multiple MPLS label fields to the next intervening node (or switch). An example of this latter case will be discussed in greater detail below). Collectively, when arranged in the MPLS label field(s), the segment IDs may be considered to be configured in a stack. In one embodiment, the routing information indicated by the segment IDs in the MPLS label field may indicate output ports of corresponding ones of the applicable nodes or switches.

In this embodiment, each of the segment IDs may be compressed to information that is 6 bits in length. This bit length may be fixed for each segment ID, but a different bit length may be used in another embodiment. Because each of the three compressed segment IDs in the MPLS label field is 6 bits in length, inserting the three compressed segment IDs into the MPLS label field will not occupy all of the fixed 20-bit length of this field. Therefore, in accordance with one or more embodiments, the remaining two bits (e.g., at bit positions 1 and 2) may be padded zeros or some other null value. Each of the nodes in the network may be programmed or otherwise configured to interpret the last two bits as padded bits when used to perform segment routing.

Figure 3A:
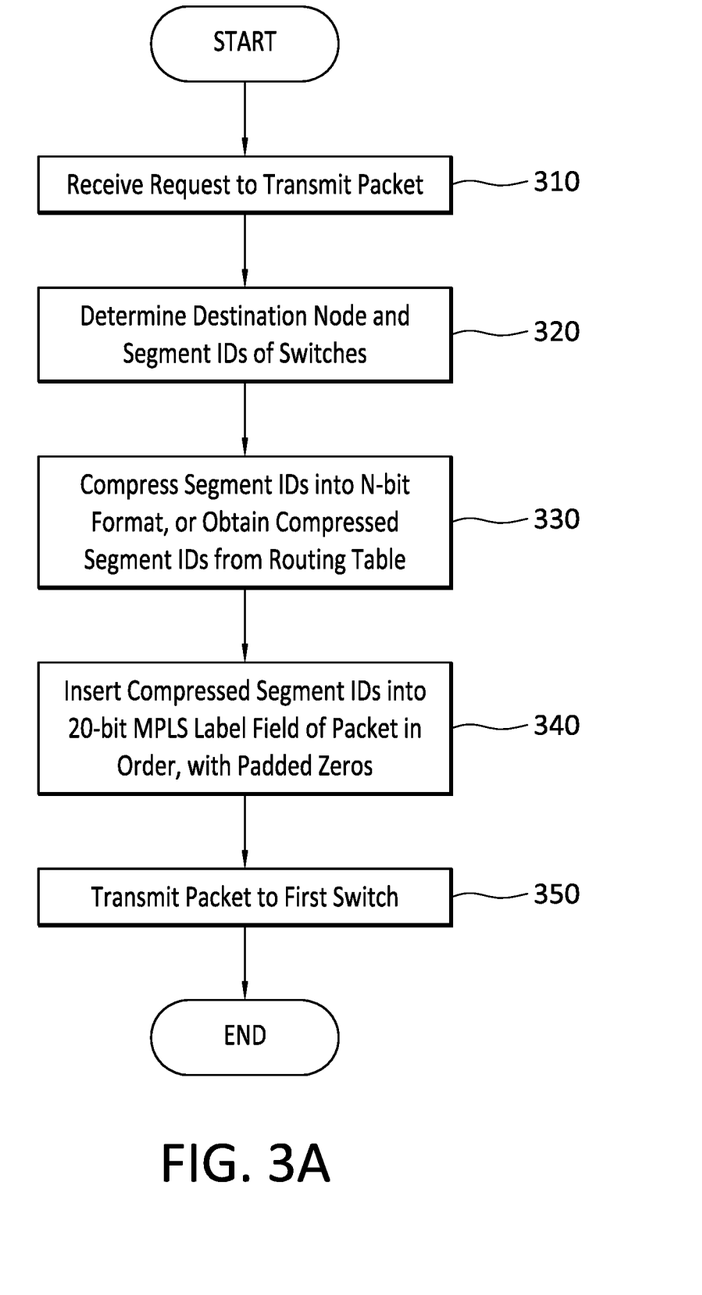
FIGS. 3A and 3B illustrate an embodiment of a method for performing segment routing in a network that uses equipment designed to route data using multi-protocol label switching (MPLS)
Figure 3B:
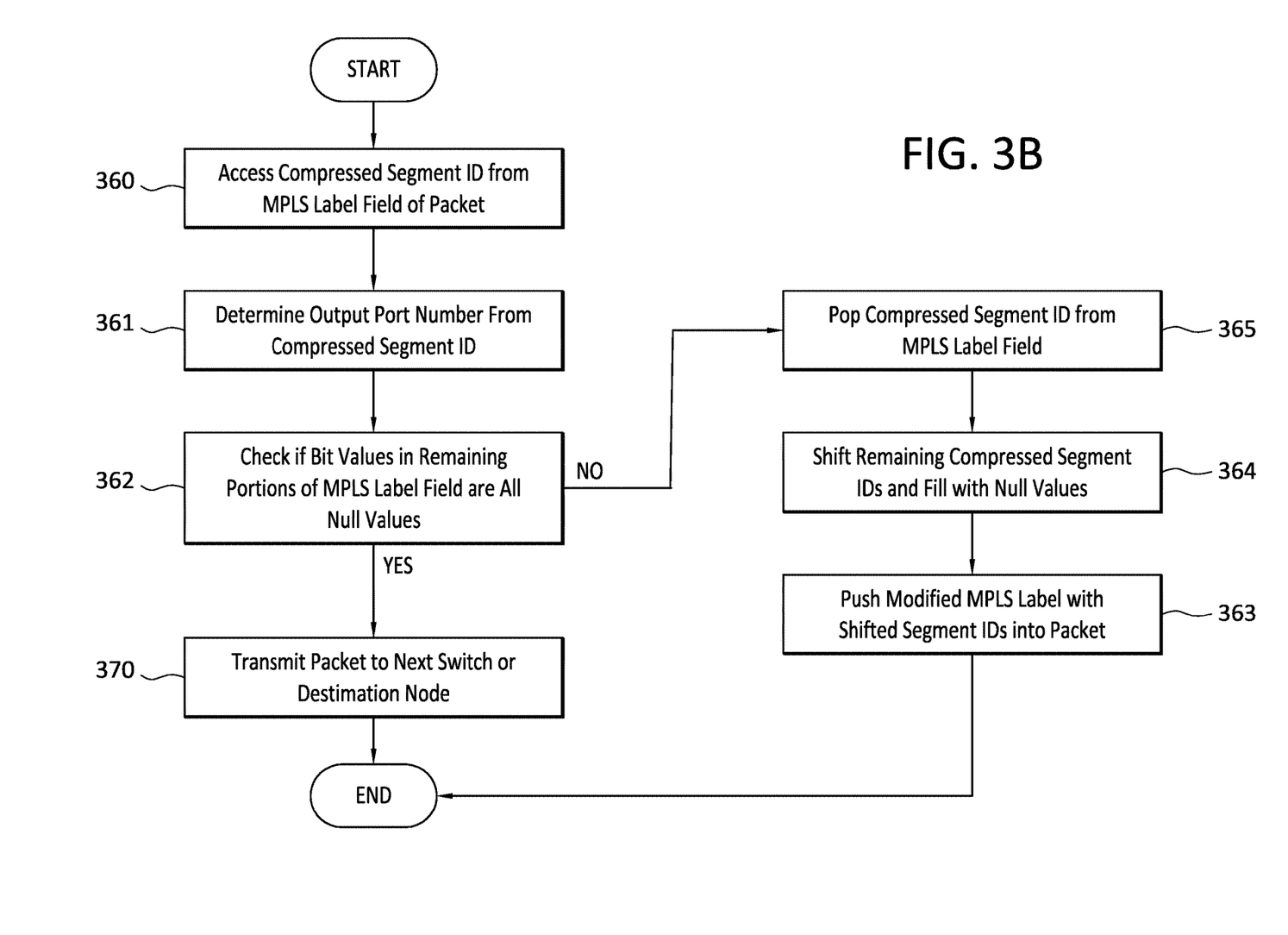

FIGS. 3A and 3B illustrate an embodiment of a method for performing segment routing in a communications network that uses equipment designed to route data using multi-protocol label switching (MPLS). The method may be explained, for example, with reference to the network of FIG. 1, which has been modified to include compressed segment IDs for 3-hops as set forth in FIG. 4A.

Figure 4A:
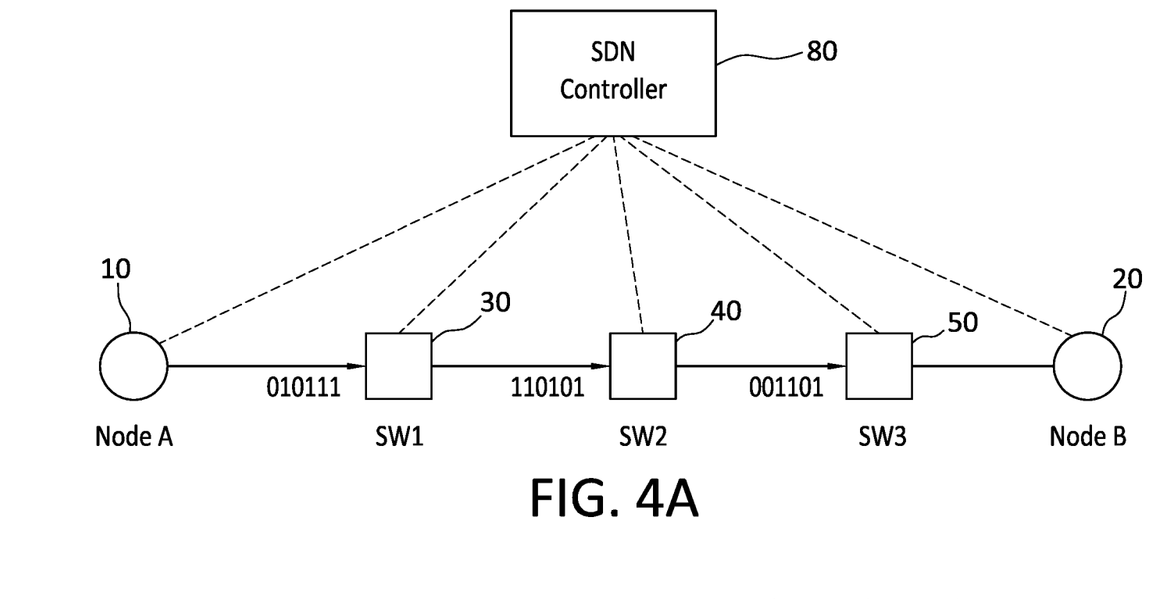
FIG. 4A illustrates a 3-hop example implemented by the method of FIGS. 3A and 3B.

Referring to FIGS. 3A, 3B, and 4A, the method includes, at 310, receiving a request to transmit a packet from the source node 10 to the destination node 20 through a network that includes MPLS routing equipment. The request may include information indicating whether transmission of the packet through the network is to be performed using MPLS routing or segment routing. The network may be, for example, the internet, a virtual private network, or another type of network that supports multiple routing and communication protocols. The request may be received from a processor of the source node, for example, from a host system, which, for example, may be a computer, smart phone, server, or another device. The destination node may be coupled, for example, to a similar device for viewing or using the packet data.

At 320, the processor of the source node may determine the identity of the destination node based on information in the request. In one implementation, the processor of the source node may receive an instruction or may be programmed with control software to transmit the packet through the network using segment routing. In this case, the processor may identify segment IDs that correspond to switches between the source and destination nodes that are to be used to route the packet through the network. The segment IDs may be determined, for example, by referencing a routing table stored at the source node or otherwise accessed from the SDN controller.

As illustrated in FIG. 4A, in this example three segment IDs for the respective switches 30, 40, and 50 have been identified identifying the next hops for transmitting the packet. Each of the switches may have multiple input and output ports. In one embodiment, the segment IDs may indicate the number of the output port of respective ones of the switches. The output port number of each port indicates to which switch the packet is to be transmitted. Thus, for example, the routing table may indicate that switch (SW) 30 is to transmit the packet through its output port numbered 23, switch (SW2) 40 is to transmit the packet through its output port numbered 53, and switch (SW3) 50 is to transmit the packet through its output port numbered 13, which leads to the destination node (Node B) 20. The identity of the switches and the corresponding output port numbers may be determined by the processor of the source node with reference to the lookup table received from the SDN controller.

At 330, once the segment IDs have been identified, the segment IDs may be compressed into an N-bit format. In one embodiment, the value of N may be 6 but may be a different number in another embodiment. In one embodiment, operation 330 may be considered to be an optional feature when, for example, the routing table already stores the segment IDs in an N-bit compressed format. In one example, compressing the segment IDs may involve identifying or mapping the output port of the nodes or switches in an N bit format.

At 340, the processor of the source node 10 inserts the compressed segment IDs into an M-bit MPLS label field 230 in the header of the packet to be transmitted to an intermediate node. In this example, the value of M is 20 and the compressed segment ID for switch (SW1) 30 is 010111, which is the binary value of the output port number 23 that is to be used to transmit the packet to switch (SW2) 40. The compressed segment ID for switch (SW2) 40 is 110101, which is the binary value of the output port number 53 that is to be used to transmit the packet to switch (SW3) 50. The compressed segment ID for switch (SW3) 50 is 001101, which is the binary value of the output port number 13 that is to be used to transmit the packet to the destination node (Node B) 20. The compressed segment IDs are shown in sequence 405 in FIG. 4B.

Figure 4B:
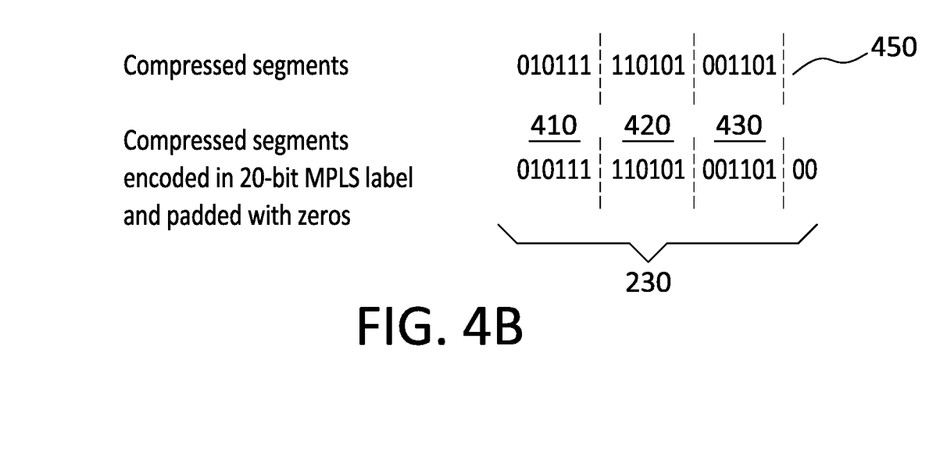
FIG. 4B illustrates an embodiment of segment IDs in an MPLS label field for the 3-hop example in accordance with one embodiment.

The segment IDs may be inserted into the MPLS label field 230 in a predetermined order. For example, the segment IDs for the switches may be stacked into the MPLS label field in sequential order, starting from the switch (SW) 30 closest to the source node 10. Thus, as illustrated in FIG. 4B, the segment ID (010111) for switch (SW1) 30 is inserted into bit positions 15 to 20 of a first sub-field 410 of the MPLS label field of the packet header, the segment ID (110101) for switch (SW2) 40 is inserted into bit positions 9 to 15 of a second sub-field 420 of the MPLS label field of the packet header, and the segment ID (001101) for switch (SW3) 50 is inserted into bit positions 3 to 8 of a third sub-field 430 of the MPLS label field of the packet header. The final two bits (at positions 1 and 2) of the MPLS label field are padded with zeros. In addition to these features, the processor of the source node may insert one or more flag bits indicating that the packet is subject to segment routing, as opposed to MPLS routing. The one or more flag bits may be stored, for example, in one of the F1 or F2 header fields illustrated in FIG. 2B. Additionally, the processor of the source node may load the data to be transmitted into the payload portion of the packet, along with any other control or other packet information to be included.

At 350, once the packet has been prepared, the source node 10 transmits the packet to the first switch (SW1) 30 through an output port designated by the processor. The first switch (SW) 30 may be considered to be an intermediate node, as well as switches 40 and 50 discussed below. As in other cases, the output port used to transmit the packet may be determined, for example, based on information in a routing table stored locally at the source node, which information is set by the network SDN controller 80.

At 360, a processor in the first switch (SW1) 30 retrieves the bit values corresponding to the compressed segment ID in the first sub-field of the MPLS label field. In this case, the compressed segment ID in the first sub-field is 010111. Once retrieved, at 361, the processor of the first switch 30 may decompress and decode the compressed segment ID (010111) to determine the port number (23) of the first switch through which the packet is to be transmitted to next switch 40. This operation may be performed by looking up the decompressed and decoded segment ID in a lookup table 510 stored at the first switch. This lookup function, first, confirms that the segment ID is a valid segment ID and, second, identifies port 23 as the proper output port for the first switch 30. The processor of switch 30 may be informed that the information in the MPLS label field contains segment IDs (as opposed to an MPLS label), for example, based on a predetermined value set in the packet header.

At 362, the processor of switch 30 may retrieve all the bits in the MPLS label field in order to determine the output port number (010111) 505. These bits correspond to the incoming MPLS label 520 of FIG. 5. The compressed segment IDs in the other two sub-fields of the MPLS label field may also be checked to determine whether they are all the same values, e.g., whether they are all zeros. If all zeros, the processor of switch 30 determines that switch 30 is the last hop and that transmission of the packet through its output node will flow to the destination node. In this example, the compressed segment IDs in the incoming MPLS label are not all zeros, so the processor of switch 30 proceeds to the next operation.

Figure 5:
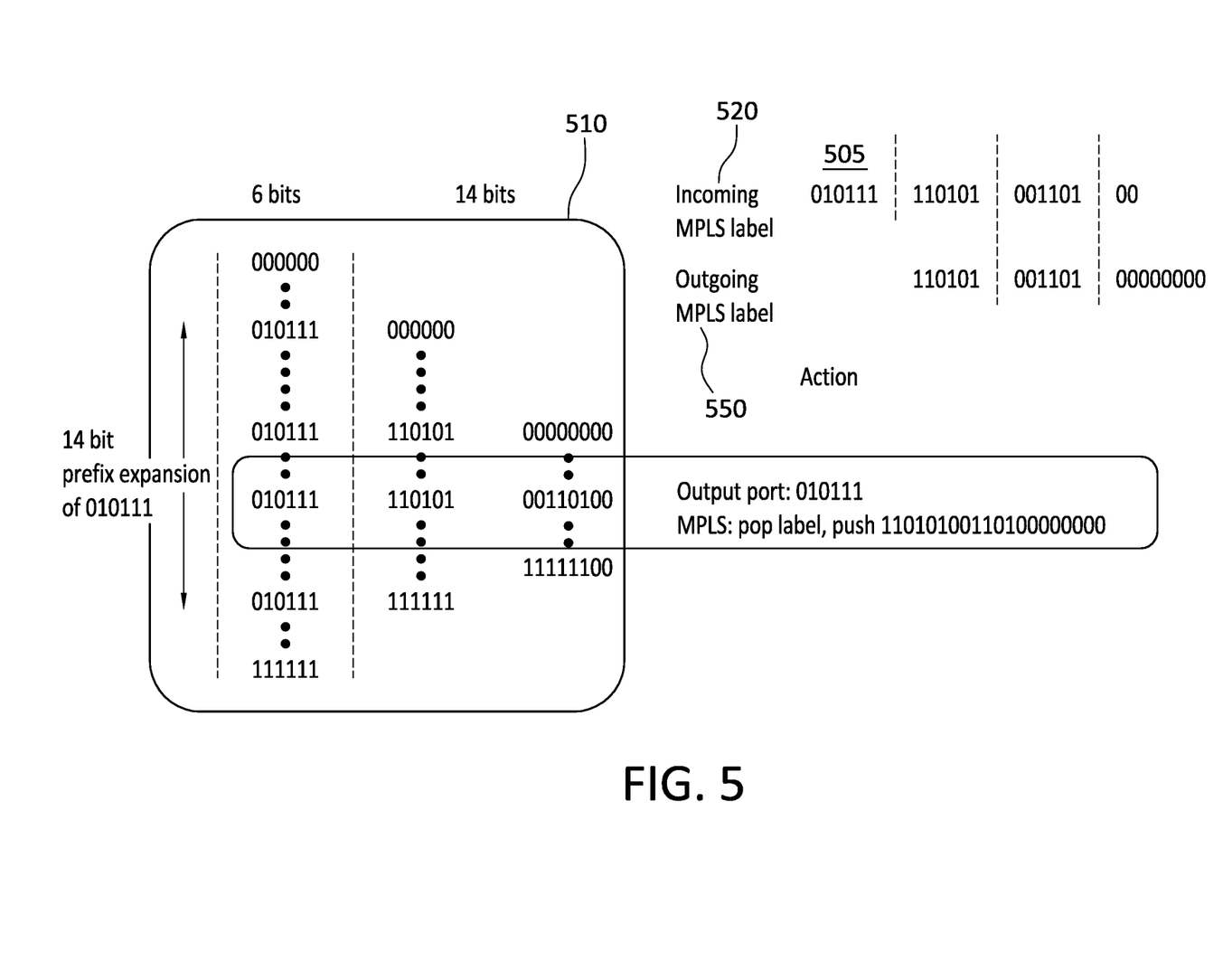
FIG. 5 illustrates modifying the MPLS label field in accordance with another embodiment.

At 363, the processor of switch 30 pops (e.g., removes from the stack in the MPLS label field) the compressed segment ID corresponding to its output port. In the example of FIG. 5, this involves removing 010111 from the first sub-field of the MPLS label field.

At 364, the compressed segment IDs in the second and third sub-fields of the MPLS label field are then shifted to the left, so that the compressed segment ID that was in the second sub-field is now in the first sub-field and the compressed segment ID that was in the third sub-field is now in the second sub-field. The third sub-field is then filled with all zeros. The result is shown as the outgoing MPLS label at 550: 11010100110100000000. In one embodiment, the shifting operation may be implicitly included in popping operation 363, e.g., the popping operation may effectively perform level shifting. In this case, operation 364 would be therefore automatically performed in operation 363, and thus process flow may pass from operation 363 to operation 365 without operation 364 being separately performed.

At 365 the processor of switch (SW1) 30 pushes the newly created outgoing MPLS label into the MPLS label field of the packet and transmits the packet to the second switch (SW2) 40 through the designated output port (port number 23) of the first switch. These pop and push operations effectively result in replacing the compressed segment IDs in the received packet header with a modified shifted version that has one of the compressed segment IDs stripped off and substituted with a corresponding number of additional padded zeros. The process of FIG. 3B is then repeated at the next node along the path that receives the packet.

Figure 6:
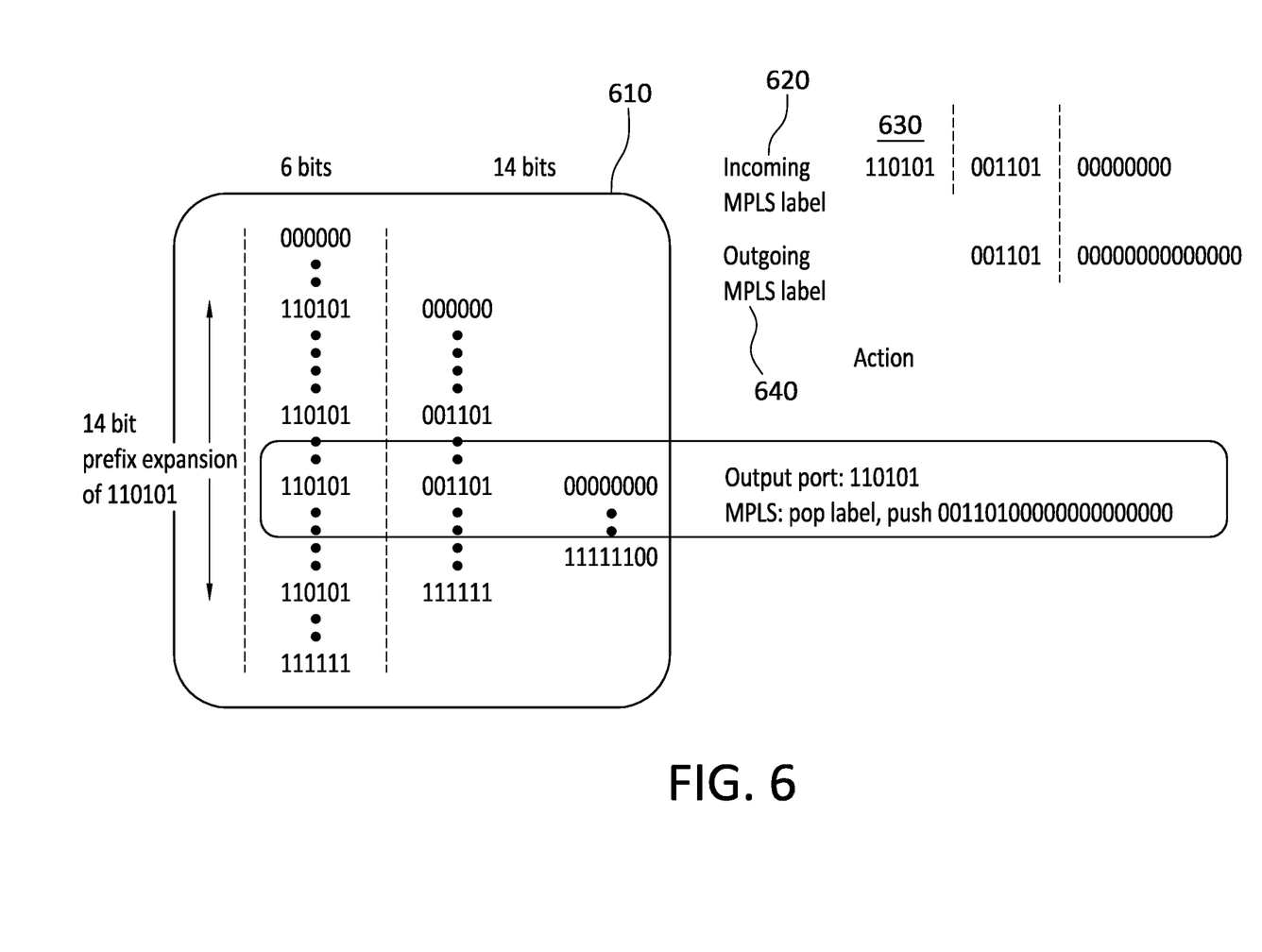
FIG. 6 illustrates modifying the MPLS label field in accordance with yet another embodiment.

For example, as illustrated in FIG. 6, a processor of switch 40 receives the following incoming label 620 in the MPLS label field of the packet received from the first switch 30: 11010100110100000000. The processor retrieves the compressed segment ID (110101) from the first sub-field of the MPLS label field, decompresses and decodes this segment ID, and then looks up the segment ID in its lookup table 610 (derived from the SDN controller) for validation and confirmation. In this case, the processor of the second switch 40 determines that it should transmit the packet through its output port number 53, which is the binary value of 110101 indicated at 630.

At this point, the processor of the second switch may retrieve the bit values in the remaining portions of the MPLS label field and determine if those bit values are all zero. If all zeros, the processor of the second switch determines that there are no more hops. In this case, the bit values in the remaining portions of the MPLS label field are not all zeros. Therefore, the processor pops the compressed segment ID (110101) in the first sub-field of the MPLS label, shifts the compressed segment ID in the second sub-field into the first sub-field, and fills the second sub-field with all zeros. The result is shown as the outgoing MPLS label at 640: 00110100000000000000. The outgoing MPLS label is then pushed into the MPLS label field of the packet and the packet is transmitted through output port number 53.

Figure 7:
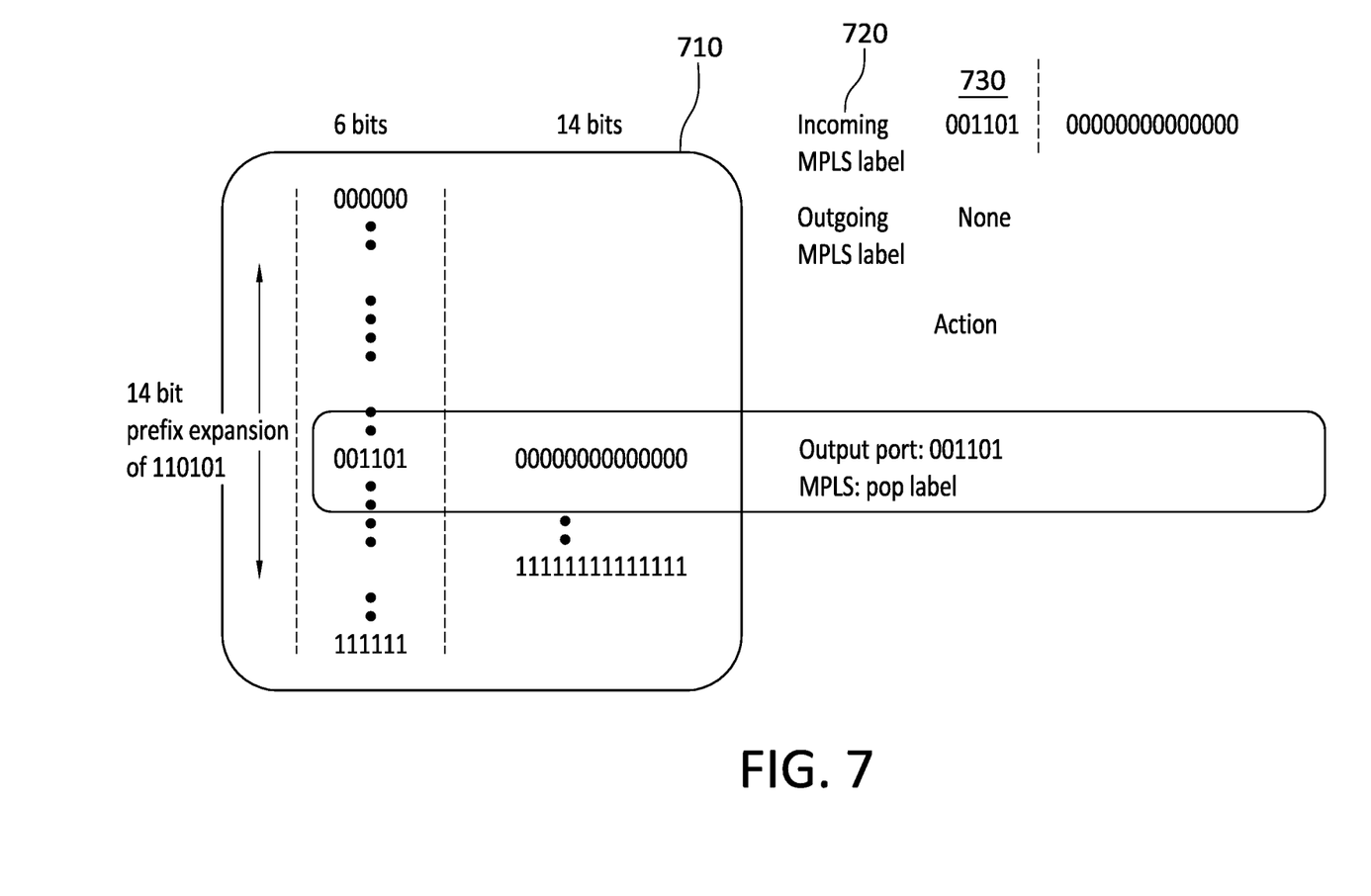
FIG. 7 illustrates modifying the MPLS label field in accordance with one embodiment.

Operations performed as previously described are now performed at switch 50. As illustrated in FIG. 7, a processor of switch 50 receives the following incoming label 720 in the MPLS label field of the packet received from the first switch 30: 00110100000000000000. The processor retrieves the compressed segment ID (001101) from the first sub-field of the MPLS label field, decompresses and decodes this segment ID, and then looks up the segment ID in its lookup table 710 (derived from the SDN controller) for validation and confirmation. In this case, the processor of the second switch 50 determines that it should transmit the packet through its output port number 13, which is the binary value of 001101 indicated at 730.

At this point, the processor of the third switch 50 may retrieve the bit values in the remaining portions of the MPLS label field and determine if those bit values are all zero. In this case, the check performed in operation 362 indicates that the bit values are all zeros. As a result, the processor of the third switch determines that there are no more hops and that transmission of the packet through port 13 will lead to the destination node (Node B) 20 (or the next node or switch in the case where there are multiple MPLS label fields in the packet header). In this case, the processor may pop the incoming MPLS label field. At 370, when the packet is transmitted through output port number 13 of the third switch, the segment routing is complete for that MPLS label.

If there are no more MPLS labels in the packet, then segment routing is complete for the entire packet.

Figure 8:
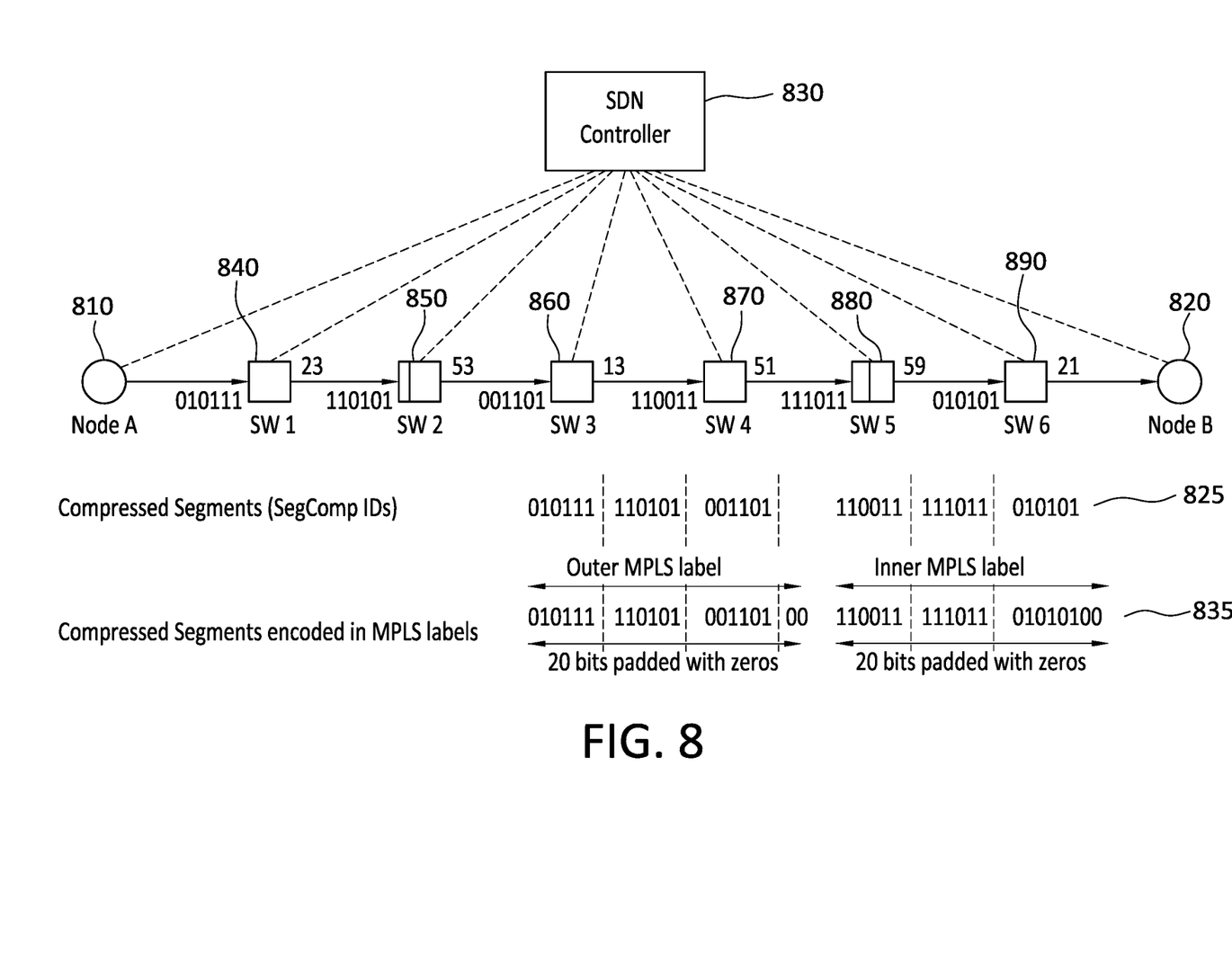
FIG. 8 illustrates a 6-hop example implemented by the method of FIGS. 3A and 3B.

FIG. 8 illustrates a six-hop example of the method for performing segment routing in a communications network that uses equipment designed to route data using multi-protocol label switching (MPLS). In this example, the first three hops correspond to the same switches in the example of FIG. 4A. The last three hops correspond to output port numbers 110011 (51), 111011 (59), and 101010 (21), respectively. The switches 840 to 890 corresponding to the six hops are arranged between a source node 810 and a destination node 820. An SDN controller 830 is used to maintain and download the lookup tables to the nodes and switches to supply the routing information need to transmit packets at respective points along the network path.

Figure 9:
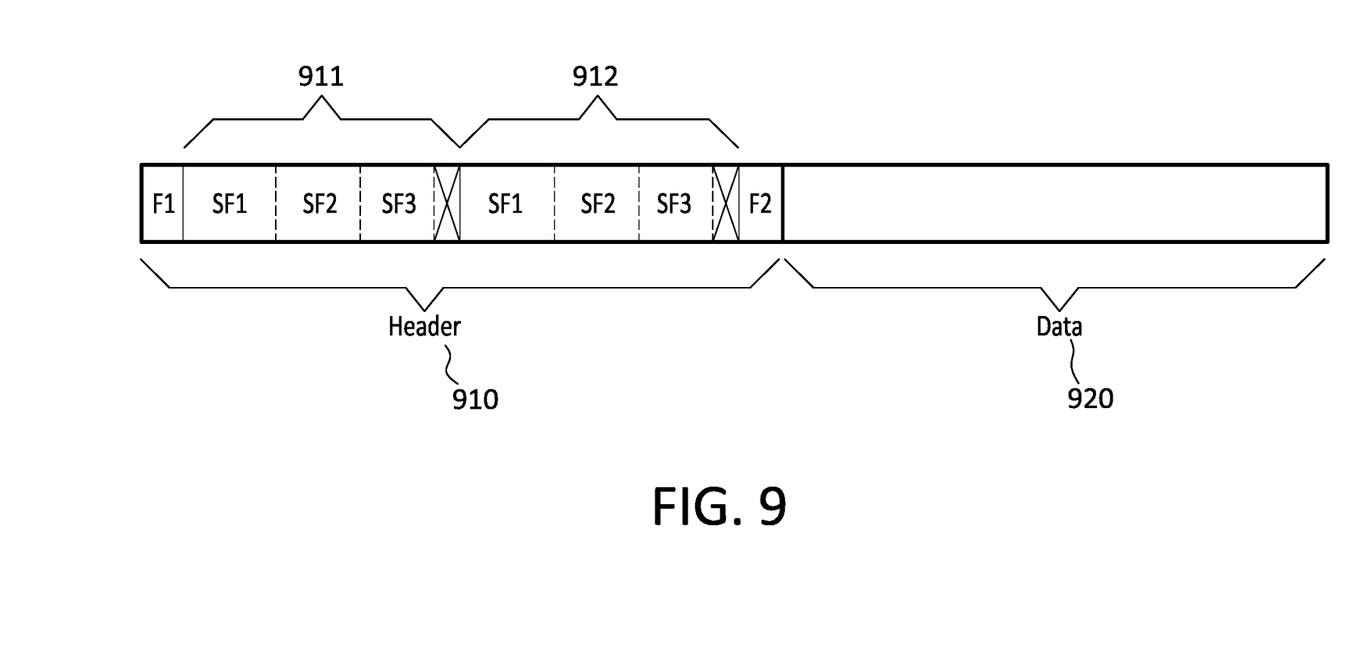
FIG. 9 illustrates an example of a packet with multiple MPLS label fields that includes segment IDs for performing the 6-hop example of FIG. 8 according to one embodiment.

FIG. 9 illustrates an example of the format of a packet routed according to the method of FIG. 8. In order to perform segment routing for six hops (or equivalently, through six switches SW1 to SW6), the packet format includes multiple MPLS label fields in the header 910. Data for the packet is included in the payload portion 920.

In the example of FIG. 9, header 911 includes a first MPLS label field 911 and a second MPLS label field 912 which may have the same format. For example, each of the MPLS label fields may include three sub-fields SF1 to SF3 and a trailing sub-field with padded zeros (marked by the X region). The sub-fields in the first MPLS label field 911 store compressed segment IDs in sequential order for the first three hops corresponding to switches SW1 to SW3 in FIG. 8. The sub-fields in the last MPLS label field 912 store compressed segment IDs in sequential order for the last three hops corresponding to switches SW4 to SW6 in FIG. 8. Referring again to FIG. 8, section 825 shows the bits values for the compressed segment IDs in the MPLS label fields 911 and 912 and section 835 shows these bit values in tandem, with padded zeros, for the MPLS label fields.

In operation, each switch SW1 to SW6 performs operations analogous to those performed by the method of the 3 hop embodiments. For example, the processor of each switch retrieves the compressed segment ID from the first sub-field of the first MPLS label field, decompresses and decodes this segment ID to determine the output port number of that switch, and then looks up the segment ID in its lookup table (derived from the SDN controller) for validation and confirmation.

At this point, the switch processor may retrieve the bit values in the remaining portions of the first MPLS label field and determine if those bit values are all zeros. If the bit values are not all zeros, the switch processor may pop the compressed segment ID in the first sub-field of the first MPLS label field, shift the bits of the remaining compressed segment ID(s), and the replace the popped segment ID with all zeros. This process continues at each switch until all of the compressed segment IDs in the first MPLS label field have been used (e.g., are all zeros), at which time the first MPLS label is popped and an analogous set of operations is performed for the second MPLS label field, until the packet reaches the destination node.

Figure 10:
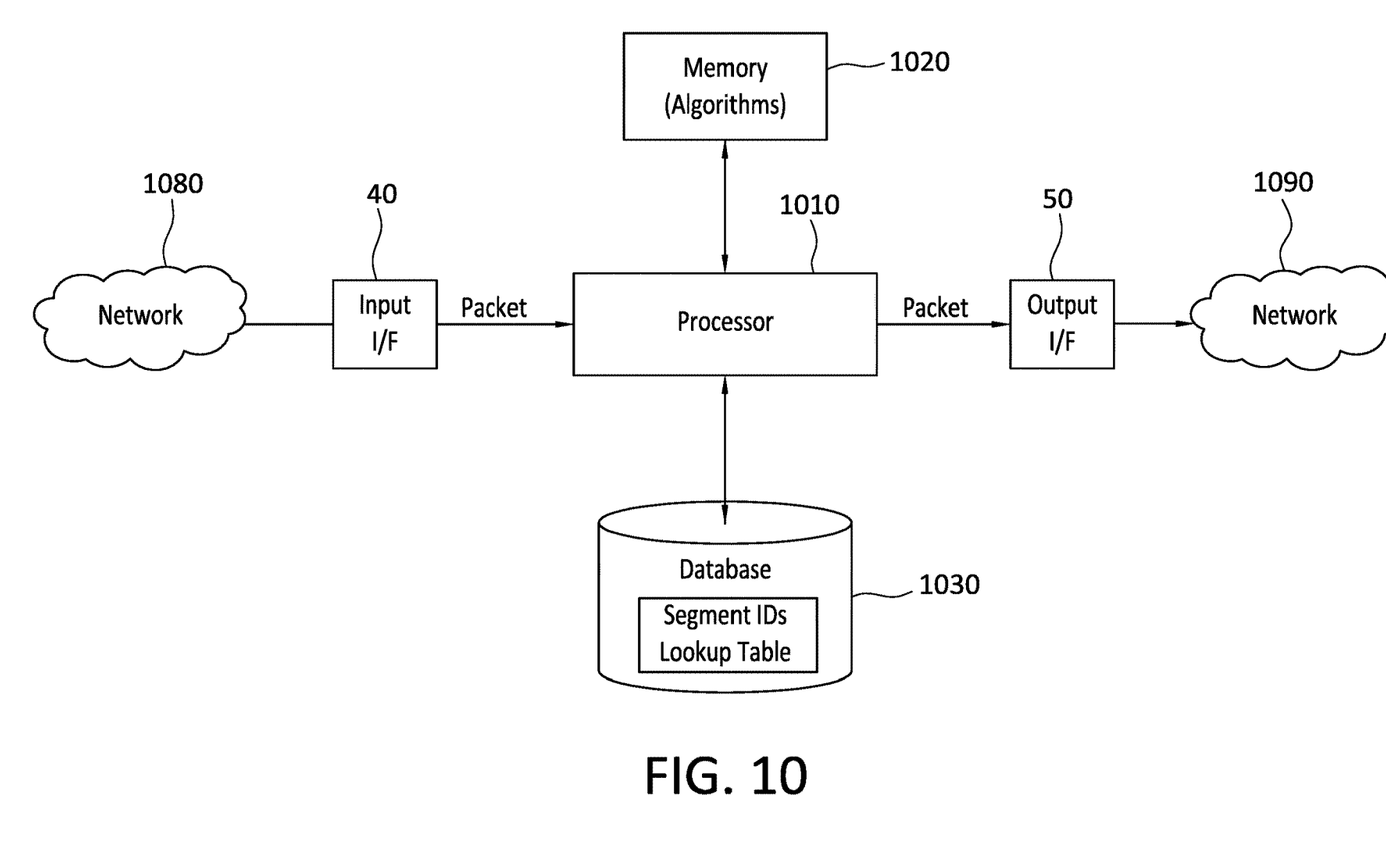
FIG. 10 illustrates an embodiment of a source node for generating a packet header in accordance with one or more of the embodiments described herein.

FIG. 10 illustrates an embodiment of a source node for generating a packet header in accordance with one or more of the embodiments described herein. The source node may include a processor 1010, a memory 1020, and a database 1030. The processor 1010 manages the operations of the source node based on algorithms stored in the memory 1020. At least a portion of these algorithms are executed by the processor 1010 to control the performance of segment routing in accordance with the method embodiments described herein.

For example, the processor 1010 may execute these algorithms to insert compressed segment IDs into one or more MPLS label fields in the header of a packet. The segment IDs may be derived from a lookup table and/or other information obtained, for example, from an SDN controller as previously described. Information corresponding to the segment IDs may be stored in the database 1030 in already compressed or uncompressed form. In this latter case, the processor 1010 may compress the segment IDs received from the database, for purposes of inserting them into respective sub-fields in the MPLS label field(s) of a packet header. The number of MPLS label fields in any given packet header may depend, for example, on the number of hops (or intervening switches) that are between the source and destination nodes. Previously, a 3-hop example requiring one 20-bit MPLS label field per packet header and a 6-hop example requiring two 20-bit MPLS label fields per packet header were discussed. In other embodiments, more than two MPLS label fields may be included in a packet header when the number of hops exceeds six. Also, a 2-hop case may be executed where the third sub-field in the MPLS label header is filled with zeros or some other null value.

In addition to these features, the source node may include an input interface 40 and an output interface 50. The input interface 40 may receive signals and other information from an SDN controller and incoming packets from other nodes or switches of a network 1080. The output interface 50 may pass outgoing packets prepared by the processor 1010 to other nodes and switches in a network 1090, which may be the same as or different from network 1080. In one embodiment, the switches between the source and destination nodes may themselves be considered to be nodes. In this case, the switches (and the destination node, for that matter) may have the same structure as the source node of FIG. 10, except that additional algorithms are included in memory to control the processor to perform pop, shift, replacement, push, and other operations as described herein.

In accordance with another embodiment, a non-transitory computer-readable storage medium stores instructions for controlling a processor to perform the operations of the embodiments described herein. At least some of the instructions correspond to the algorithms stored in memory 1020 of the source node. These and/or other instructions may be implemented by the SDN controller, processors of the switches, node controllers, and/or other processing devices arranged along the network path carrying packets configured as described herein. The computer-readable medium may be, for example, a read-only memory, a random-access memory, a flash memory, network-attached storage, storage area network, or another type of storage device capable of storing software, firmware, and/or other instructions for implementing the embodiments described herein.

The processors, controllers, switches, routers, lookup tables, and other signal-generating and signal-processing features of the embodiments disclosed herein may be implemented in logic. When implemented at least partially in hardware, the processors, controllers, switches, routers, lookup tables, and other signal-generating and signal-processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the processors, controllers, switches, routers, lookup tables, and other signal-generating and signal-processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods herein.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A non-transitory machine-readable storage medium may include any mechanism for storing information in a form readable by a machine, such as a personal or laptop computer, a server, or other computing device. Thus, a non-transitory machine-readable storage medium may include read-only memory (ROM), random-access memory (RAM), magnetic disk storage media, optical storage media, flash-memory devices, and similar storage media and excludes transitory signals.

It should be appreciated by those skilled in the art that any blocks and block diagrams herein represent conceptual views of illustrative circuitry embodying the principles of the invention. Implementation of particular blocks can vary while they can be implemented in the hardware or software domain without limiting the scope of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Accordingly, it is to be understood that the above description is intended to be illustrative and not restrictive. Many embodiments and applications other than the examples provided would be apparent upon reading the above description. The scope should be determined, not with reference to the above description or Abstract below, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for controlling packet routing in a network, comprising:
   identifying segment identifications (IDs) for a number of switches;
   arranging a first number of the segment IDs into a first field of a packet, wherein the first field is a first multi-protocol label switching (MPLS) label field that is M bits in length, each of the segment IDs being represented by N bits in length and identifying an output port of a respective one of the number of switches located along a network path between a source node and a destination node, and M is greater than a cumulative sum of respective Ns for the first quantity of segment IDs; and
   padding the first MPLS label field with one or more predetermined values for bits unoccupied by the segment IDs.

2. The method of claim 1, wherein the first number of segment IDs are arranged in the first MPLS label field in an order corresponding to a sequence of a path of traversed switches on the network path.

3. The method of claim 1, wherein the one or more predetermined values are zeros.

4. The method of claim 1, wherein the first number of the segment IDs arranged into the first MPLS label field corresponds to all of the switches on the network path between the source node and the destination node.

5. The method of claim 1, where each of the N-bit representations are a compressed version of the respective segment IDs.

6. The method of claim 5, further comprising:
   arranging a second number of the segment IDs into a second MPLS label field.

7. The method of claim 1, further comprising:
   identifying the segment IDs based on information in a routing table.

8. A method for controlling packet routing, comprising:
   receiving a packet at a switch of a data network;
   accessing first routing information from the packet;

modifying the packet to include second routing information; and transmitting the packet from the switch based on the first routing information, wherein the packet includes a first multi-protocol label switching (MPLS) label field from which the first routing information is accessed, the first routing information including a first segment identification (ID) and at least a second segment ID, and wherein modifying the packet includes replacing the first routing information with the second routing information by replacing the first segment ID with one or more predetermined values in the first MPLS label field, the second routing information omitting the first segment ID and including at least the second segment ID, and the packet transmitted from the switch is based on the first segment ID.

9. The method of claim 8, wherein the one or more predetermined values are zeros.

10. The method of claim 8, wherein replacing the first routing information with the second routing information includes shifting a position of the at least second segment ID in the first MPLS label field.

11. The method of claim 10, wherein the second routing information includes padded zeros included with the shift position of the at least second segment ID in the first MPLS label field.

12. The method of claim 8, further comprising:

determining an output port number based on the first segment ID, wherein transmitting the packet based on the first routing information includes transmitting the packet through the output port number.

13. A system for controlling packet routing in a network, comprising:

a memory configured to store computer instructions; and a processor configured to execute the computer instructions to:

identify segment identifications (IDs) for a number of switches, and arrange a first number of the segment IDs into a first field of a packet, wherein the first field is a first multi-protocol label switching (MPLS) label field that is M bits in length, each of the segment IDs being represented by N bits in length and identifying an output port of a respective one of the number of switches located along a network path between a source node and a destination node, M is greater than a cumulative sum of respective Ns for the first quantity of segment IDs, and the processor is configured to pad the first MPLS label field with one or more predetermined values for bits unoccupied by the segment IDs.

14. The system of claim 13, wherein the processor is configured to arrange the first quantity of segment IDs in the first MPLS label field in an order corresponding to a sequence of a path of traversed switches on the network path.

15. The system of claim 13, wherein the first number of the segment IDs arranged into the first MPLS label field corresponds to all of the switches on the network path between the source node and the destination node.

16. The system of claim 13, wherein the processor is configured to arrange a second number of the segment IDs into a second field of the packet when the number of switches is greater than three, and wherein the second field of the packet is a second MPLS label field.

17. A system for controlling packet routing in a network, comprising:

a memory configured to store computer instructions; and a processor configured to execute the computer instructions to:

identify segment identifications (IDs) for a number of switches, and arrange a first number of the segment IDs into a first field of a packet, wherein the first field is a first multi-protocol label switching (MPLS) label field that is M bits in length, each of the segment IDs being represented by N bits in length and identifying an output port of a respective one of the number of switches located along a network path between a source node and a destination node, M is greater than a cumulative sum of respective Ns for the first quantity of segment IDs, the first MPLS field has a length of M bits, and each of the first number of segment IDs is compressed into N bits, where $M \geq 3 \cdot N$.

* * * * *